US011317002B2

(12) United States Patent
Shin et al.

(10) Patent No.: US 11,317,002 B2
(45) Date of Patent: Apr. 26, 2022

(54) RESPONSE DELAY TIME DETERMINATION TO MAINTAIN LONG POLLING CONNECTION (71) Applicant: Hewlett-Packard Development Company, L.P., Spring, TX (US)

(72) Inventors: Woo Chul Shin, Seongnam-si (KR); Jeong Hun Kim, Seongnam-si (KR); Seung Wan Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 163 days.

(21) Appl. No.: 16/761,982

(22) PCT Filed: Jul. 16, 2018

(86) PCT No.: PCT/KR2018/008000
§ 371 (c)(1),
(2) Date: May 6, 2020

(87) PCT Pub. No.: WO2019/103269
PCT Pub. Date: May 31, 2019

(65) Prior Publication Data
US 2021/0409568 A1 Dec. 30, 2021

(30) Foreign Application Priority Data
Nov. 21, 2017 (KR) .................. 10-2017-0155813

(51) Int. Cl.
H04N 1/32 (2006.01)
H04N 1/00 (2006.01)
(52) U.S. Cl.
CPC ..... H04N 1/32673 (2013.01); H04N 1/00244 (2013.01); H04N 1/32032 (2013.01);
(Continued)

(58) Field of Classification Search
CPC .... G06F 3/1203; G06F 3/1206; G06F 3/1222; G06F 3/126; G06F 3/1288; G06F 3/1292
See application file for complete search history.

(56) References Cited

U.S. PATENT DOCUMENTS 6,366,741 B1    4/2002  Fukushima
8,102,431 B2 *  1/2012  Kim .................. G06Q 50/00
                                           348/211.1
(Continued)

FOREIGN PATENT DOCUMENTS

CN    103620576 A    3/2014
CN    105491594 A    4/2016
(Continued)

Primary Examiner — Miya J Williams
(74) Attorney, Agent, or Firm — Jefferson IP Law, LLP (57) ABSTRACT An image forming apparatus and method for determining a response delay time for maintaining a long polling connection are provided. In an example, the image forming apparatus includes a communication device to communicate with an external device, a processor, and a memory storing instructions executable by the processor. The processor may execute the instructions to request the external device for a response about whether a job to be performed by the image forming apparatus is present based on a response delay time for long polling the external device by the image forming apparatus. The processor may also execute the instructions to detect an error from the response, adjust the response delay time, and determine a final response delay time for maintaining connection of the long polling by re-adjusting the adjusted response delay time based on a result of performing the long polling based on the adjusted response delay time.

15 Claims, 9 Drawing Sheets (52) U.S. Cl.
CPC . *H04N 1/32641* (2013.01); *H04N 2201/0036* (2013.01); *H04N 2201/0072* (2013.01); *H04N 2201/0094* (2013.01)

(56) References Cited

U.S. PATENT DOCUMENTS

| | | | |
|---|---|---|---|
| 2005/0018236 A1* | 1/2005 | Shirai | G06F 3/1204 358/1.14 |
| 2012/0182864 A1 | 7/2012 | Heinz et al. | |
| 2013/0007219 A1 | 1/2013 | Sorenson, III et al. | |
| 2015/0092233 A1 | 4/2015 | Park et al. | |
| 2015/0271359 A1* | 9/2015 | Nakai | H04N 1/32694 358/1.15 |

FOREIGN PATENT DOCUMENTS

| | | | |
|---|---|---|---|
| CN | 106027837 A | 10/2016 | |
| CN | 108429800 A | 8/2018 | |
| EP | 3 076 285 A1 | 10/2016 | |
| JP | 2006-319707 A | 11/2006 | |
| JP | 2008-177740 A | 7/2008 | |
| JP | 2009-65349 A | 3/2009 | |
| JP | 2013-88967 A | 5/2013 | |
| KR | 10-2016-0025886 A | 3/2016 | |

\* cited by examiner

| N | RESPONSE DELAY TIME | ERROR OCCURRENCE TIME DUE TO DISCONNECTION OF NETWORK BY FIREWALL OR PROXY | ERROR OCCURRENCE RESPONSE RECEPTION TIME |
|---|---|---|---|
| 1 | 10MIN | 3MIN 20SEC | 4MIN 40SEC |
| 2 | 4MIN 30SEC | 3MIN 20SEC | 4MIN 40SEC |
| 3 | 4MIN | 3MIN 20SEC | 4MIN 40SEC |
| 4 | 3MIN 30SEC | 3MIN 20SEC | 4MIN 40SEC |
| 5 | 3MIN | X | NORMAL RESPONSE IS RECEIVED |

| N | RESPONSE DELAY TIME | ERROR OCCURRENCE TIME DUE TO EXTERNAL DEVICE | ERROR OCCURRENCE RESPONSE RECEPTION TIME |
|---|---|---|---|
| 1 | 1MIN 30SEC | X | NORMAL RESPONSE IS RECEIVED |
| 2 | 2MIN | X | NORMAL RESPONSE IS RECEIVED |
| 3 | 2MIN 30SEC | X | NORMAL RESPONSE IS RECEIVED |
| 4 | 3MIN | X | NORMAL RESPONSE IS RECEIVED |
| 5 | 3MIN 30SEC | 3MIN 20SEC | 4MIN 40SEC |

[Fig. 11]

| N | RESPONSE DELAY TIME | ERROR OCCURRENCE TIME DUE TO DISCONNECTION OF NETWORK BY FIREWALL OR PROXY | ERROR OCCURRENCE RESPONSE RECEPTION TIME |
|---|---|---|---|
| 1 | 10MIN | 3MIN 20SEC | 3MIN 30SEC |
| 2 | 3MIN | X | NORMAL RESPONSE IS RECEIVED |
| 3 | 3MIN 15SEC | X | NORMAL RESPONSE IS RECEIVED |
| 4 | 3MIN 22SEC | 3MIN 20SEC | 3MIN 30SEC |

RESPONSE DELAY TIME DETERMINATION TO MAINTAIN LONG POLLING CONNECTION

BACKGROUND ART

Polling is a technique by which a client cyclically requests a server for a response about whether data to be transmitted to the client is present, and the server responds to the request when the data is present. That is, polling may be based on a request scheme of the client and a response scheme of the server.

In long polling, the client may not continuously wait for a response from the server but may complete a transaction of a request from the client to the server and a response from the server to the client after a certain time and request a response from the server again.

BRIEF DESCRIPTION OF DRAWINGS

The above and other aspects, features, and advantages of certain examples of the present disclosure will be more apparent from the following description taken in conjunction with the accompanying drawings, in which.

Throughout the drawings, it should be noted that like reference numbers are used to depict the same or similar elements, features, parts, components, and structures.

MODE FOR THE INVENTION

The term "image forming apparatus" may include all apparatuses capable of performing an image forming job, e.g., a printer, a scanner, a copier, a fax machine, a multi-function printer (MFP), a display device, or the like. The term "print data" may indicate data converted to a format printable by a printer, and the term "scan file" may indicate a file generated by a scanner by scanning an image.

In the following description, only certain examples of the present disclosure are shown and described, simply by way of illustration. As one of ordinary skill in the art would realize, the described examples may be modified in various different ways, all without departing from the scope of the present disclosure. As used herein, expressions such as "at least one of," when preceding a list of elements, modify the entire list of elements and do not modify the individual elements of the list.

Figure 1:
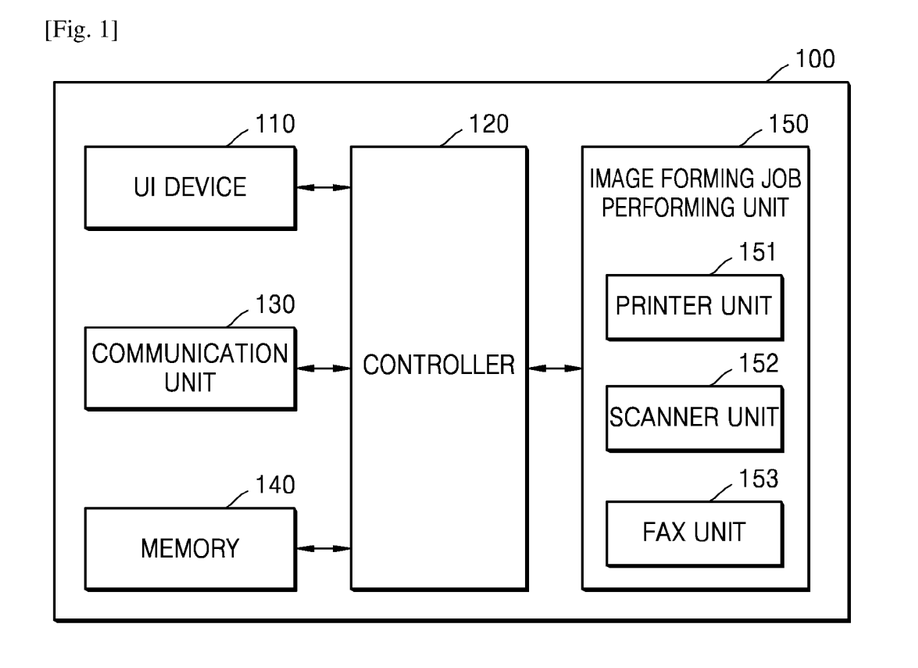
FIG. 1 is a block diagram of an image forming apparatus according to an example.

FIG. 1 is a block diagram of an image forming apparatus according to an example.

Referring to FIG. 1, an image forming apparatus 100 may include a user interface (UI) device 110, a controller 120, a communication unit 130, a memory 140, and an image forming job performing unit 150. Although not shown in FIG. 1, the image forming apparatus 100 may further include a power supply to supply power to the other elements.

The UI device 110 may include an input unit to receive, from a user, an input indicating to perform an image forming job, and an output unit to display information such as a result of performing the image forming job or status information of the image forming apparatus 100. For example, the UI device 110 may include an operation panel to receive user inputs, and a display panel to display screen images.

More specifically, the input unit may include any of devices capable of receiving various user inputs, for example, a keyboard, a physical button, a touch screen, a camera, a microphone, or the like. The output unit may include, for example, a display panel, a speaker, or the like. However, the UI device 110 is not limited thereto and may include any of devices supporting various inputs and outputs.

The controller 120 controls overall operations of the image forming apparatus 100, and may include at least one processor such as a central processing unit (CPU). The controller 120 may control the other elements of the image forming apparatus 100 to perform an operation corresponding to a user input received through the UI device 110. The controller 120 may include two or more specialized processors corresponding to different functions, or include a single integrated processor.

For example, the controller 120 may execute programs stored in the memory 140, read data or files stored in the memory 140, or store new files in the memory 140.

The communication unit 130 may communicate with another device or a network in a wired or wireless manner. To this end, the communication unit 130 may include a communication module, such as a transceiver, supporting at least one of various wired and wireless communication schemes. For example, the communication module may be implemented as a chipset, a sticker/barcode including information required for communication (e.g. a sticker including a near-field communication (NFC) tag), or the like.

The communication unit 130 may support at least one of, for example, Wireless Fidelity (Wi-Fi), Wi-Fi Direct, Bluetooth, Ultra-Wide Band (UWB), NFC, or the like. The communication unit 130 may support at least one of, for example, Universal Serial Bus (USB), High Definition Multimedia Interface (HDMI), or the like.

The communication unit 130 may be connected to and transmit and receive signals or data to and from an external device located outside the image forming apparatus 100. For example, the image forming apparatus 100 may be connected to a user device through the communication unit 130. The communication unit 130 may transmit signals or data received from the user device to the controller 120, or transmit signals or data generated by the controller 120 to the user device. For example, when the communication unit 130 receives a print instruction signal and print data from the user device, the controller 120 may output the received print data through a printer unit 151.

The image forming apparatus 100 of FIG. 1 may perform, through the communication unit 130, long polling communication for cyclically requesting an external server for a response about a job of the image forming apparatus 100, and receiving a response from the external server. As an example, the image forming apparatus 100 may perform long polling by requesting information from the external server with the expectation that the external server may not respond immediately. That is, the external server may hold the request open until a response, such as new data, is available. Once available, the external server may respond and send the new information. Thus, if the external server has no new information for the image forming apparatus 100 when the request is received, instead of sending an empty response, the external server may hold the request open and wait for response information to become available.

Figure 2:
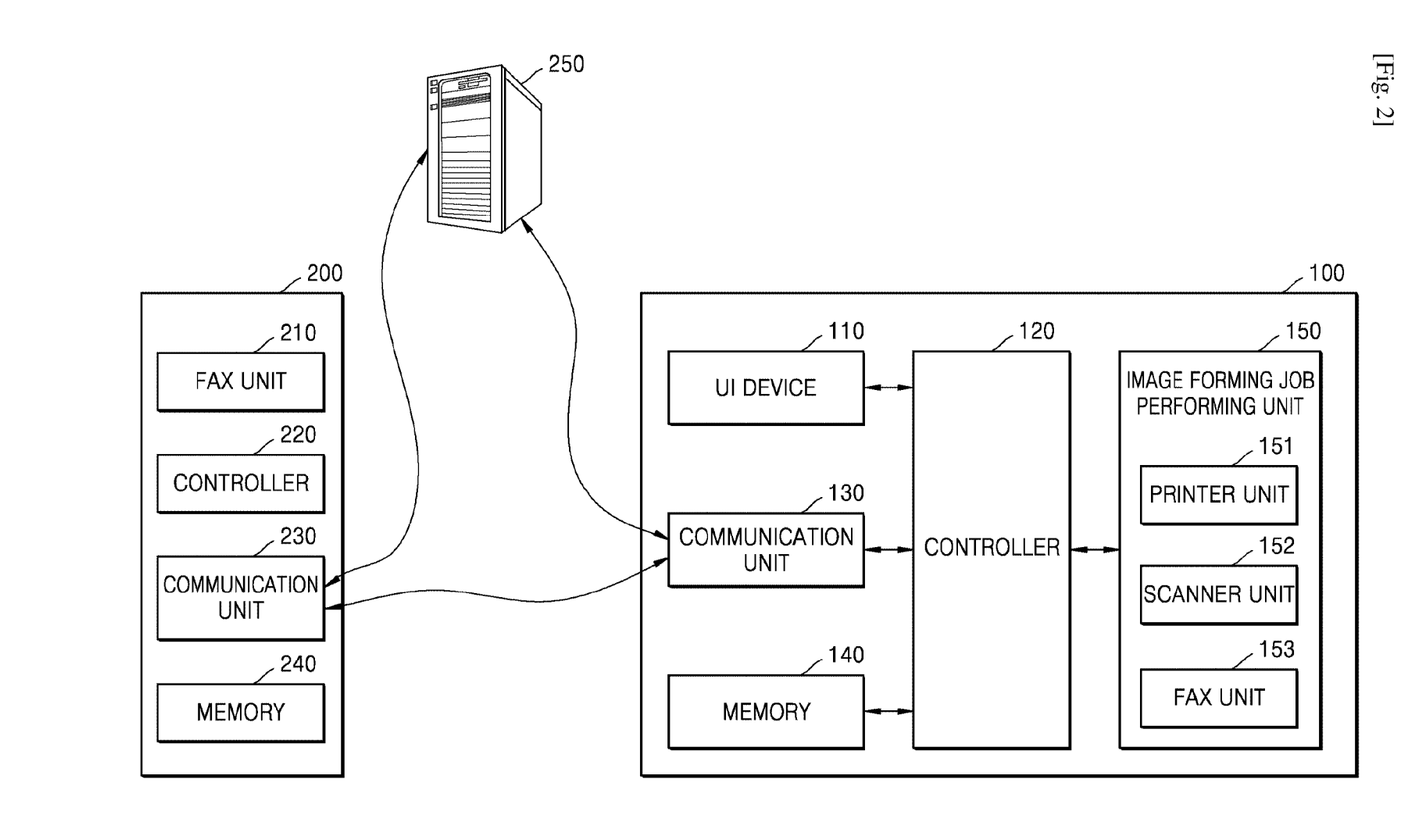
FIG. 2 is a block diagram showing a connection between an image forming apparatus and a user device or a server according to an example.

FIG. 2 is a block diagram showing connection between an image forming apparatus and a user device or a server, according to an example.

Referring to FIG. 2, a user device 200 may include an input/output unit 210, a controller 220, a communication unit 230, and a memory 240. The controller 220 may control an image forming job by executing a program stored in the memory 240, and transmitting a signal or data generated as a result of executing the program, to the image forming apparatus 100 through the communication unit 230. The user device 200 may include, for example, a smartphone, a tablet, a personal computer (PC), a home appliance, medical equipment, a camera, a wearable device, or the like.

The communication unit 130 may be directly connected to and transmit and receive signals or data to and from the server 250. Alternatively, the communication unit 130 may be connected to the user device 200 through the server 250. That is, the communication unit 130 of the image forming apparatus 100 may transmit and receive signals or data to and from the communication unit 230 of the user device 200 through the server 250.

Referring back to FIG. 1, the memory 140 may have installed therein programs such as applications and have stored therein various types of data such as files. The controller 120 may access and use the data stored in the memory 140, or store new data in the memory 140. In addition, the controller 120 may execute the programs installed in the memory 140. The controller 120 may install, in the memory 140, an application received from outside through the communication unit 130.

The image forming job performing unit 150 may perform an image forming job such as printing, scanning, copying or faxing.

The image forming job performing unit 150 includes the printer unit 151, a scanner unit 152, and a fax unit 153. However, the image forming job performing unit 150 may include only a part of the above-mentioned elements, or may further include an element to perform another type of image forming job.

The printer unit 151 may form an image on a recording medium based on various print schemes such as an electrophotography scheme, an inkjet scheme, a thermal transfer scheme, a thermosensitive scheme, or the like.

The scanner unit 152 may read an image recorded on a document, by projecting light onto the document and receiving reflected light on an image sensor. Examples of an image sensor for reading an image from a document include a charge coupled device (CCD) or a contact type image sensor (CIS). The scanner unit 152 may have a flatbed structure in which the document is located at a fixed position and the image sensor reads an image while moving, a document feed structure in which the image sensor is located at a fixed position and the document is fed, or a combination thereof.

The fax unit 153 may share an image scanning configuration with the scanner unit 152, share a file printing configuration with the printer unit 151, and transmit a scanned file to a destination or receive a file from outside.

The above-described elements of the image forming apparatus 100 may be named differently. The image forming apparatus 100 according to an example may include at least one of the above-described elements, and some elements may be omitted or additional elements may be further included.

The UI device 110 of FIG. 1 may have an independent control system. That is, independently of the controller 120 of the image forming apparatus 100, the UI device 110 may include a control system (e.g., a controller and a memory) for controlling a user interface (UI) provided by the UI device 110. An operating system (OS) for providing a UI and programs (e.g., applications) for performing various functions may be installed in the control system of the UI device 110.

The image forming apparatus 100 of FIG. 2 may perform long polling communication for cyclically requesting the server 250 for a response about a job of the image forming apparatus 100 or the user device 200, and receiving a response from the server 250, through the communication unit 130. The user device 200 of FIG. 2 may perform long polling communication for cyclically requesting the server 250 for a response about a job of the image forming apparatus 100 or the user device 200, and receiving a response from the server 250, through the communication unit 230.

Figure 3:
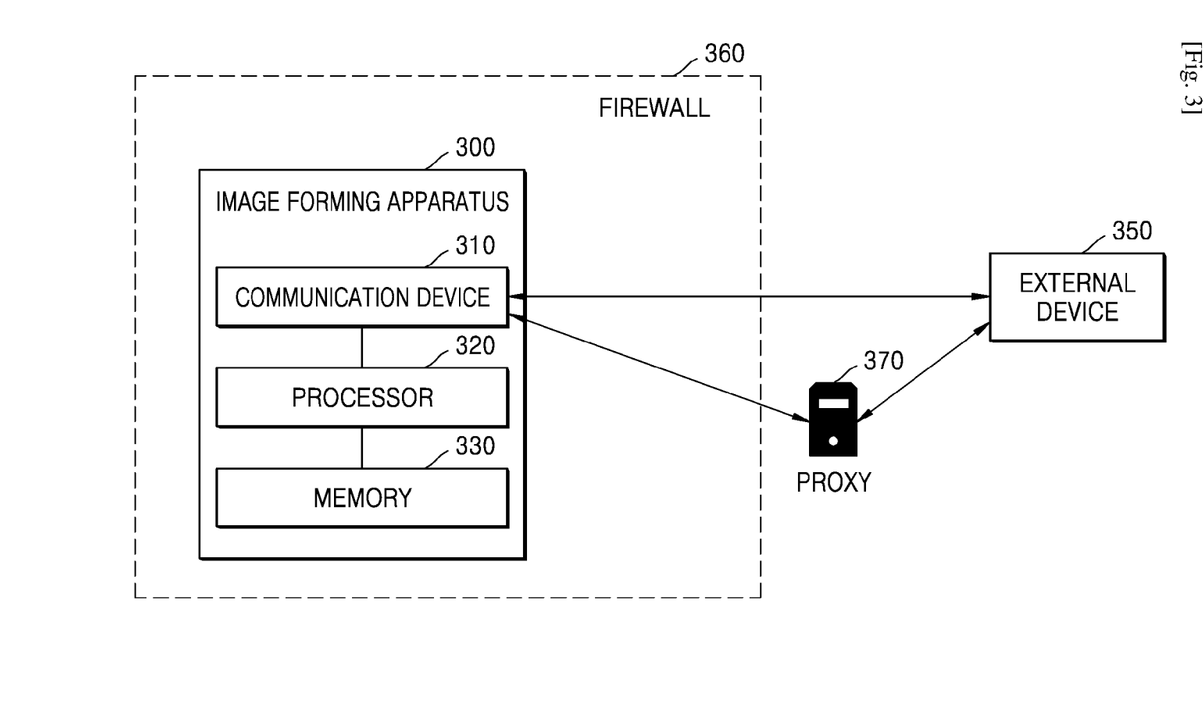
FIG. 3 is a block diagram of an image forming apparatus according to another example.

FIG. 3 is a block diagram of an image forming apparatus according to another example.

Referring to FIG. 3, an image forming apparatus 300 may include a communication device 310, a processor 320, and a memory 330. However, not all of the illustrated elements are required and the image forming apparatus 300 may include a larger or smaller number of elements. The above-mentioned elements will now be described.

The communication device 310 may correspond to the communication unit 130 illustrated in FIG. 1, the processor 320 may correspond to the controller 120 illustrated in FIG. 1, and the memory 330 may correspond to the memory 140 illustrated in FIG. 1. Thus, repeated descriptions between FIGS. 1 and 3 will not be provided herein.

The communication device 310 may communicate with an external device 350. Herein, the external device 350 may be a device connectable to the image forming apparatus 300. For example, the external device 350 may be a server but is not limited thereto.

The processor 320 may request the external device 350 for a response about whether a job to be performed by the image forming apparatus 300 is present, based on a response delay time for long polling the external device 350 by the image forming apparatus 300.

The term "response delay time" may refer to a delay in time by which the image forming apparatus 300 may receive a response from the external device 350 after the image forming apparatus 300 requests the external device 350 for a response about whether a job to be performed by the image forming apparatus 300 is present. The response delay time may also be called a timeout value. The response delay time may be a value determined by the image forming apparatus 300 or the external device 350, or a value determined based on a policy of the external device 350.

The term "job" may indicate any of various jobs related to image forming and image file generation/storing/transmission (e.g., printing, scanning, copying, faxing, or the like). A job may not only indicate an image forming job but also comprehensively indicate a series of processes required to perform an image forming job.

The processor 320 may receive a response to the request from the external device 350. When data to be transmitted as a response to a long-polled request from the image forming apparatus 300 is not present during the response delay time, the external device 350 may transmit a response indicating that data to be transmitted as a response is not present, at a timing at which the response delay time is to be finished.

The processor 320 may detect an error between the image forming apparatus 300 and the external device 350, the error corresponding to a value of the received response. Herein, the error may be an error due to the external device 350 or an error due to a network between the image forming apparatus 300 and the external device 350, but is not limited thereto. For example, the error due to the network may be an error due to disconnection of the network by a firewall 360 or a proxy 370.

The processor 320 may adjust the response delay time based on the error. The processor 320 may determine a final response delay time for maintaining a long polling connection by re-adjusting the adjusted response delay time based on a result of performing long polling using the adjusted response delay time. For example, the processor 320 may determine whether an error is detected again by performing long polling based on the adjusted response delay time. The processor 320 may increase or reduce the adjusted response delay time based on whether an error is detected again. For example, the processor 320 may reduce the adjusted response delay time by a preset time. Alternatively, the processor 320 may increase the adjusted response delay time by a preset time.

The processor 320 may determine the final response delay time in such a manner that an error is not detected by repeatedly performing long polling based on the re-adjusted response delay time.

An example of a procedure in which the image forming apparatus 300 determines the final response delay time by reducing the response delay time will be described with reference to FIGS. 7 and 8. An example of a procedure in which the image forming apparatus 300 determines the final response delay time by increasing the response delay time will be described with reference to FIGS. 9 and 10.

Before the image forming apparatus 300 performs continuous long polling to the external device 350, the image forming apparatus 300 may determine whether a network is connected between the image forming apparatus 300 and the external device 350. The image forming apparatus 300 may determine whether a network is connected between the image forming apparatus 300 and the external device 350 by performing long polling based on a minimum response delay time for long polling. Herein, the minimum response delay time may be a time not influenced by disconnection of the network by the firewall 360 or the proxy 370. Therefore, when an error is not detected by repeatedly performing long polling based on the minimum response delay time, the image forming apparatus 300 may determine that the network is normally connected between the image forming apparatus 300 and the external device 350.

Upon determining that the network is normally connected between the image forming apparatus 300 and the external device 350, the processor 320 may request the external device 350 for a response about whether a job to be performed by the image forming apparatus 300 is present, based on a maximum response delay time for long polling. The processor 320 may receive a response to the request from the external device 350 through the communication device 310.

The processor 320 may determine the type of an error based on a value of the received response. For example, the processor 320 may determine whether the error is due to the external device 350 or due to the network between the image forming apparatus 300 and the external device 350, based on the response value. When the error is due to the network, the processor 320 may determine whether the error is due to disconnection of the network by the firewall 360 or the proxy 370.

For example, when the external device 350 is a server, the image forming apparatus 300 may determine whether a response received from the server is a normal response based on a value of the response. For instance, when the value of the response received from the server is 200, the response may be a normal response. When the value of the response received from the server is 4xx or 5xx, the response may be an abnormal response including an error due to the server and indicating that the server has an error in data processing or that the image forming apparatus 300 has transmitted wrong request data. When a response is not received from the server, the processor 320 may check an error value returned from an application programming interface (API) used to request a response from the server. The processor 320 may determine whether the checked error value corresponds to an error related to the network and, when the error value corresponds to an error due to the network, determine whether the error is due to disconnection of the network by the firewall 360 or the proxy 370.

According to an example, when the error is due to disconnection of the network by the firewall 360 or the proxy 370, the processor 320 may adjust the response delay time within a time from a timing at which long polling is started to a timing at which the response including the error is received. When an error is detected again by performing long polling based on the adjusted response delay time, the processor 320 may repeatedly perform long polling by reducing the adjusted response delay time by a preset time until an error does not occur. The processor 320 may determine a response delay time corresponding to a timing at which an error is not detected by repeatedly performing long polling based on the reduced response delay time, as the final response delay time. Herein, the final response delay time may be an optimal response delay time for maintaining a long polling connection to the external device 350 by the image forming apparatus 300.

According to another example, when the error is not due to disconnection of the network by the firewall 360 or the proxy 370, the processor 320 may adjust the response delay time to a minimum value of a long polling cycle. When an error is not detected by performing long polling based on the response delay time adjusted to the minimum value of the long polling cycle, the processor 320 may increase the adjusted response delay time by a preset time until an error occurs. The processor 320 may determine a response delay time corresponding to a timing immediately before a timing at which an error is detected again by repeatedly performing long polling based on the increased response delay time, as the final response delay time.

When a network connection maintenance time set between the image forming apparatus 300 and the external device 350 by the firewall 360 or the proxy 370 is changed, the processor 320 may determine the final response delay time for maintaining long polling connection by re-adjusting the response delay time. For example, it is assumed that the network connection maintenance time set between the image forming apparatus 300 and the external device 350 by the firewall 360 or the proxy 370 is set to be 4 minutes and that the final response delay time is set to be 3 minutes 50 seconds. When the network connection maintenance time set by the firewall 360 or the proxy 370 is changed to 3 minutes, the image forming apparatus 300 may not appropriately communicate with the external device 350 based on the previously set final response delay time, i.e., 3 minutes 50 seconds. Therefore, the processor 320 may re-determine the final response delay time for maintaining long polling connection by reducing the response delay time (for example, the processor 320 may determine the final response delay time to be 2 minutes 50 seconds).

The memory 330 may store programs and data or files related to the image forming apparatus 300. The processor 320 may execute the programs stored in the memory 330, read the data or the files stored in the memory 330, or store new files in the memory 330. The memory 330 may store program instructions, data files, data structures, etc. separately or in combination.

For example, the memory 330 may store instructions for requesting the external device 350 for a response about whether a job to be performed by the image forming apparatus 300 is present based on a response delay time for long polling the external device 350 by the image forming apparatus 300, instructions for detecting an error corresponding to a response value of a response received for the request, instructions for adjusting the response delay time based on the error, and instructions for determining a final response delay time maintaining long polling connection by re-adjusting the adjusted response delay time based on a result of performing long polling based on the adjusted response delay time. In addition, the memory 330 may include instructions related to operation of the processor 320 for determining the final response delay time.

The processor 320 may comprehensively control operations of the communication device 310 and the memory 330. The processor 320 may be implemented as an array of multiple logic gates, or as a combination of a general-use micro processor and a memory having stored therein programs executable by the micro processor. It will be understood by one of ordinary skill in the art that the processor 320 may be implemented as another type of hardware.

In the following description, context clearly understandable and expectable by one of ordinary skill in the art without specifying each element of the image forming apparatus 300 may be understood as general implementation, and the scope of the present disclosure is not limited by the name of a certain element or a physical/logical structure.

Figure 4:
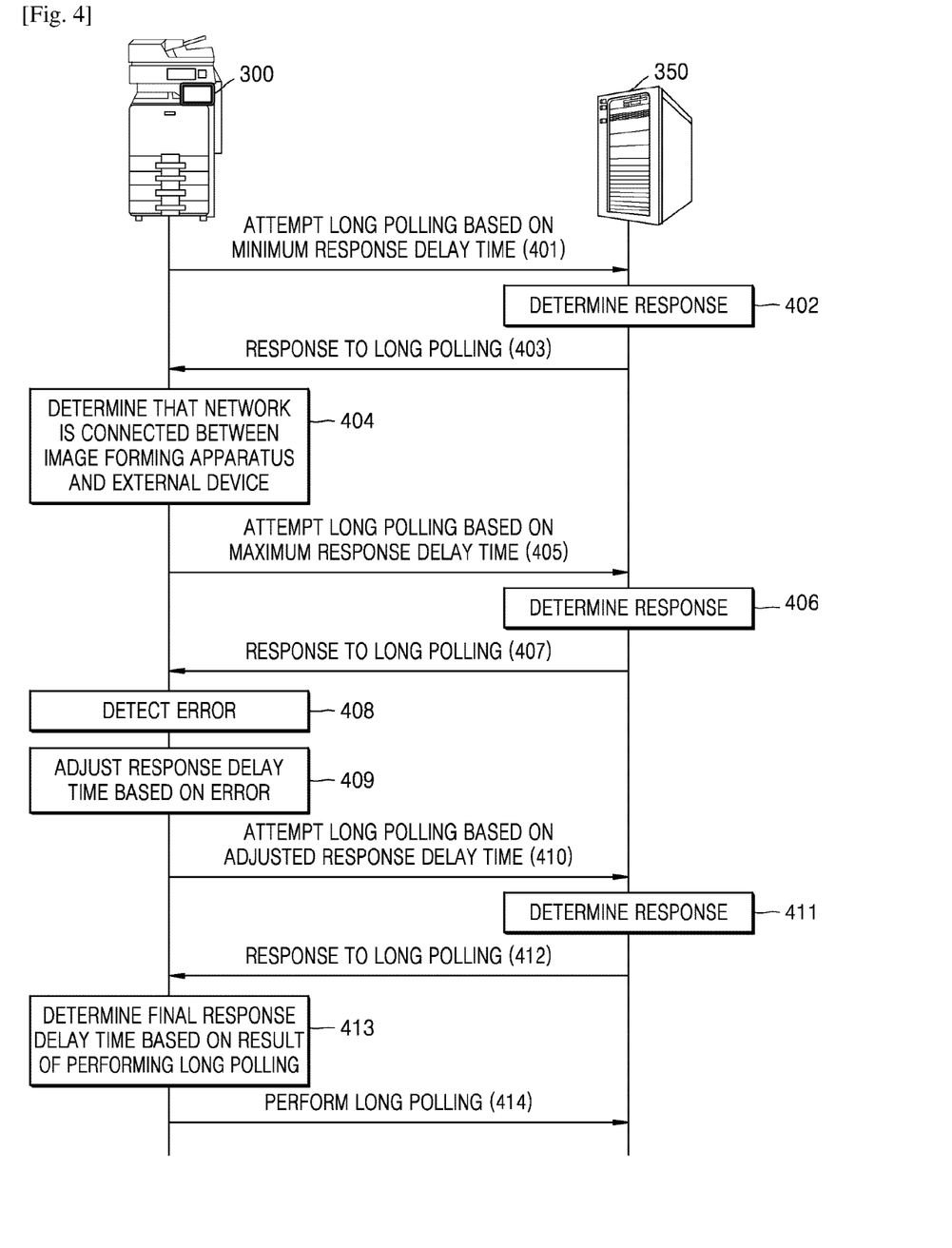
FIG. 4 is a flowchart for describing a procedure of setting a response delay time for long polling an external device by an image forming apparatus according to an example.

FIG. 4 is a flowchart for describing a procedure of setting a response delay time for long polling an external device by an image forming apparatus according to an example.

Referring to FIG. 4, the image forming apparatus 300 may attempt long polling based on a minimum response delay time in operation 401. Herein, the minimum response delay time may be a time not influenced by disconnection of a network by the firewall 360 or the proxy 370. In operation 402, the external device 350 may determine a response to long polling. In operation 403, the image forming apparatus 300 may receive the response to long polling from the external device 350. In operation 404, when the response to long polling is normal, the image forming apparatus 300 may determine that a network is normally connected between the image forming apparatus 300 and the external device 350. When an error is not detected by repeatedly performing long polling based on the minimum response delay time, the image forming apparatus 300 may determine that the network is normally connected between the image forming apparatus 300 and the external device 350.

In operation 405, the image forming apparatus 300 may attempt long polling based on a maximum response delay time. In operation 406, the external device 350 may determine a response to long polling. In operation 407, the image forming apparatus 300 may receive the response to long polling from the external device 350. In operation 408, the image forming apparatus 300 may detect an error corresponding to a value of the received response. When the external device 350 has data with which to respond and thus the image forming apparatus 300 normally receives a response from the external device 350, the image forming apparatus 300 may maintain a long polling connection based on the previously set response delay time without performing a process for adjusting the response delay time.

Figure 9:
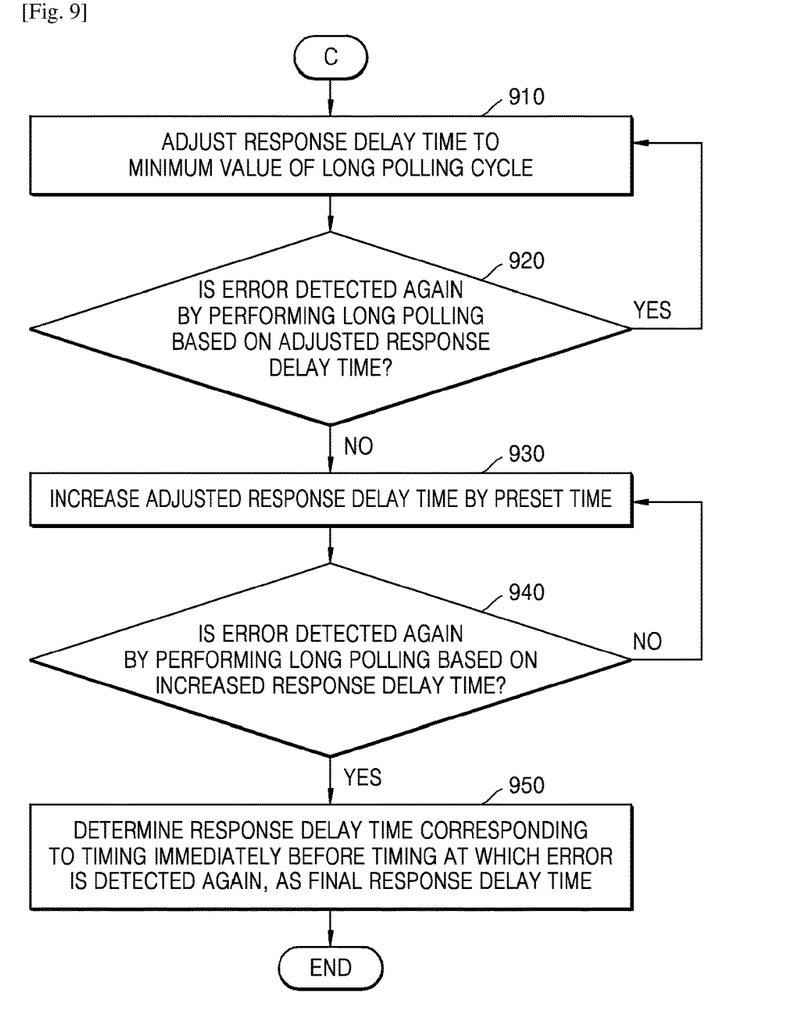
FIG. 9 is a flowchart of a method of determining a response delay time by an image forming apparatus when an error is not due to disconnection of a network by a firewall or a proxy according to an example.

In operation 409, the image forming apparatus 300 may adjust the response delay time based on the detected error. When the detected error is an error due to disconnection of the network by the firewall 360 or the proxy 370, the image forming apparatus 300 may adjust the response delay time as illustrated in the flowchart of FIG. 7. When the detected error is an error due to the external device 350 or an error other than the error due to disconnection of the network by the firewall 360 or the proxy 370, the image forming apparatus 300 may adjust the response delay time as illustrated in the flowchart of FIG. 9.

In operation 410, the image forming apparatus 300 may attempt long polling based on the adjusted response delay time. In operation 411, the external device 350 may determine a response to long polling. In operation 412, the image forming apparatus 300 may receive the response to long polling from the external device 350. In operation 413, the image forming apparatus 300 may determine a final response delay time based on a result of performing long polling. The image forming apparatus 300 may determine whether the final response delay time does not have any problem by repeatedly performing long polling to the external device 350 based on the final response delay time. In operation 414, the image forming apparatus 300 may continuously perform long polling based on the final response delay time.

Figure 5:
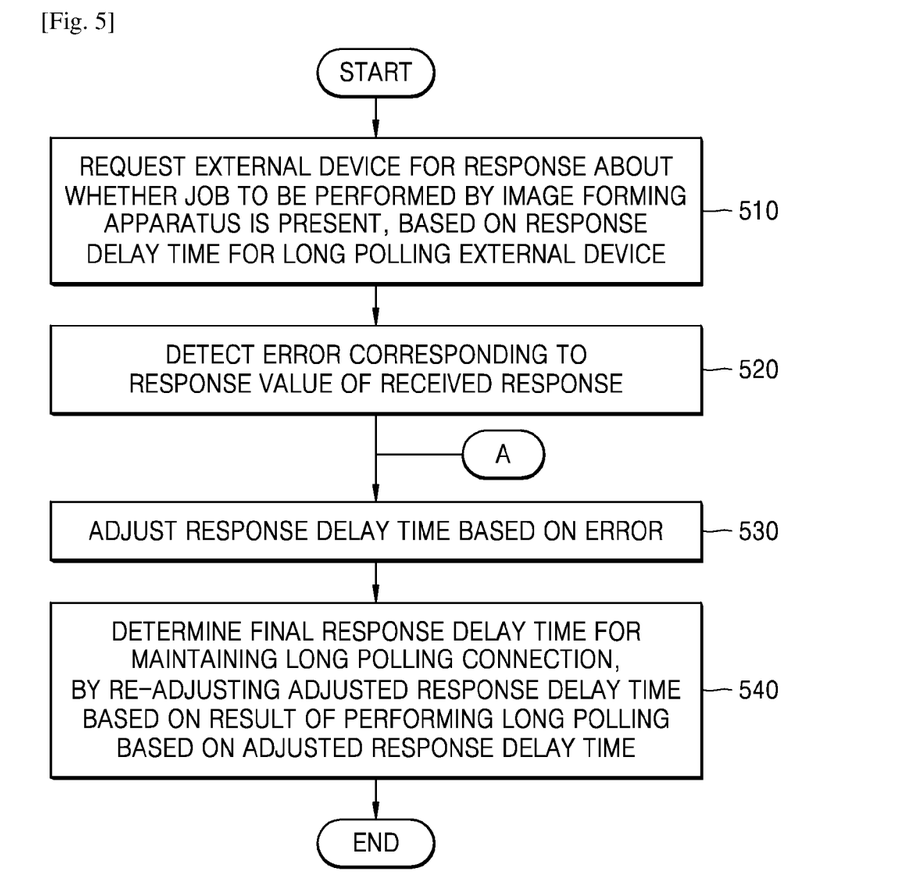
FIG. 5 is a flowchart of a method of determining a response delay time for maintaining long polling connection by an image forming apparatus according to an example.

FIG. 5 is a flowchart of a method of determining a response delay time for maintaining long polling connection by an image forming apparatus according to an example.

Referring to FIG. 5, the image forming apparatus 300 may request the external device 350 for a response about whether a job to be performed by the image forming apparatus 300 is present based on a response delay time for long polling the external device 350 in operation 510. For example, the image forming apparatus 300 may attempt long polling to the external device 350 based on a maximum response delay time for long polling. The image forming apparatus 300 may determine whether a network is normally connected between the image forming apparatus 300 and the external device 350 and attempt long polling.

In operation 520, the image forming apparatus 300 may detect an error corresponding to a value of a received response. For example, when the external device 350 is a server and the response value of the response received from the server is 4xx or 5xx, the image forming apparatus 300 may determine an error due to the server, and specifically detect the error due to the server as an error corresponding to the response value. When a response is not received from the server, the image forming apparatus 300 may check an error value returned from an API used to request a response from the server and determine whether the error value corresponds to an error related to the network. When the error value corresponds to an error related to the network, the image forming apparatus 300 may specifically detect the error related to the network as an error corresponding to the error value (e.g., an error due to disconnection of the network by the firewall 360 or the proxy 370).

In operation 530, the image forming apparatus 300 may adjust the response delay time based on the error.

In operation 540, the image forming apparatus 300 may determine a final response delay time for maintaining a long polling connection by re-adjusting the adjusted response delay time based on a result of performing long polling based on the adjusted response delay time. Operations 530 and 540 of the image forming apparatus 300 will be described below with reference to FIGS. 7 to 11.

Figure 6:
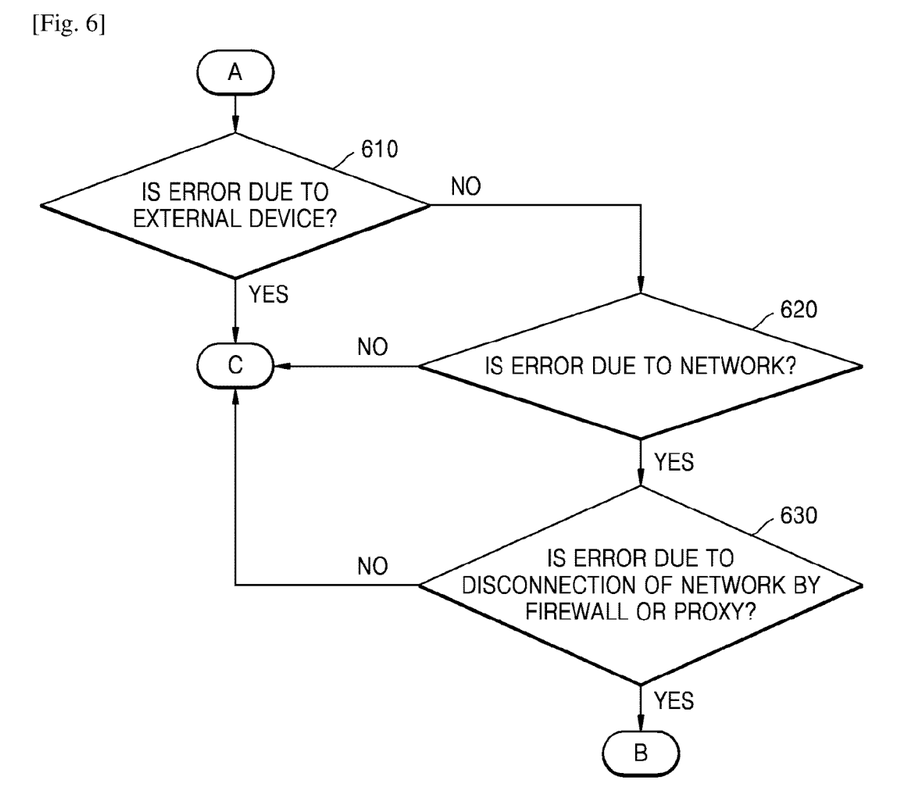
FIG. 6 is a flowchart of a method of determining a response delay time based on a type of an error detected by an image forming apparatus according to an example.

FIG. 6 is a flowchart of a method of determining a response delay time based on a type of an error detected by an image forming apparatus according to an example.

Referring to FIG. 6, the image forming apparatus 300 may determine whether an error is due to the external device 350 in operation 610. When the error is due to the external device 350, the image forming apparatus 300 may operate as illustrated in the flowchart of FIG. 9. Otherwise, when the error is not due to the external device 350, the image forming apparatus 300 may proceed to operation 620.

In operation 620, the image forming apparatus 300 may determine whether the error is due to the network. When the error is due to the network, the image forming apparatus 300 may proceed to operation 630. Otherwise, when the error is not due to the network, the image forming apparatus 300 may operate as illustrated in the flowchart of FIG. 9.

In operation 630, the image forming apparatus 300 may specifically determine whether the error due to the network is due to disconnection of the network by the firewall 360 or the proxy 370. When the error is due to disconnection of the network by the firewall 360 or the proxy 370, the image forming apparatus 300 may operate as illustrated in the flowchart of FIG. 7. Otherwise, when the error is not due to disconnection of the network by the firewall 360 or the proxy 370, the image forming apparatus 300 may operate as illustrated in the flowchart of FIG. 9.

Figure 7:
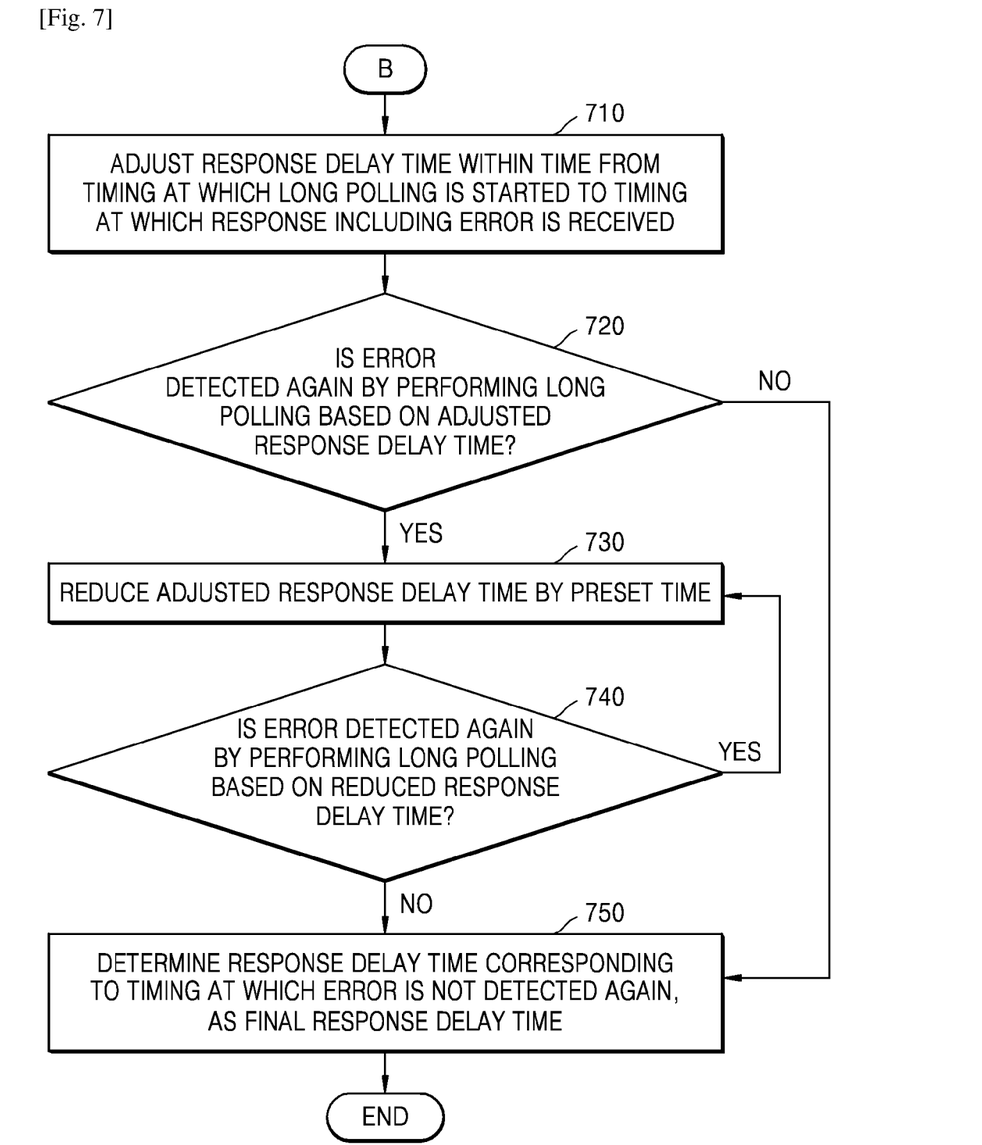
FIG. 7 is a flowchart of a method of determining a response delay time by an image forming apparatus when a detected error is due to disconnection of a network by a firewall or a proxy according to an example.

FIG. 7 is a flowchart of a method of determining a response delay time by an image forming apparatus when a detected error is due to disconnection of the network by a firewall or a proxy according to an example.

Referring to FIG. 7, the image forming apparatus 300 may adjust the response delay time within a time from a timing at which long polling is started to a timing at which a response including an error is received in operation 710. Since a timing at which the error occurs is not known, the image forming apparatus 300 may adjust the response delay time with respect to the timing at which the response including the error is received. For example, the image forming apparatus 300 may adjust the response delay time by reducing the time from the timing at which long polling is started to the timing at which the response including the error is received, by a preset time.

In operation 720, the image forming apparatus 300 may determine whether an error is detected again by performing long polling based on the adjusted response delay time. When an error is detected again, according to operation 730, the image forming apparatus 300 may reduce the adjusted response delay time by a preset time. When an error is not detected again, according to operation 750, the image forming apparatus 300 may determine the adjusted response delay time as the final response delay time.

In operation 740, the image forming apparatus 300 may determine whether an error is detected again by performing long polling based on the reduced response delay time. When an error is detected again, the image forming apparatus 300 may perform long polling by further reducing the reduced response delay time by a preset time, and determine whether an error is detected again.

When an error is not detected again, according to operation 750, the image forming apparatus 300 may determine the response delay time corresponding to a timing at which an error is not detected again, as the final response delay time.

Figure 8:
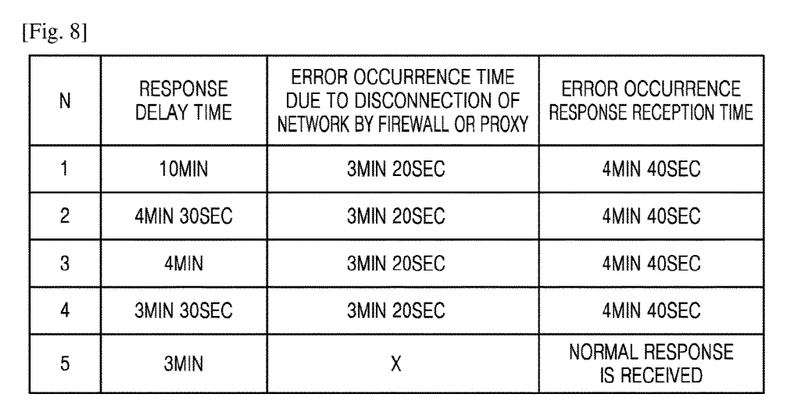
FIG. 8 is a table for describing a procedure of determining a final response delay time by adjusting a response delay time by an image forming apparatus when an error is due to disconnection of a network by a firewall or a proxy according to an example.

FIG. 8 is a table for describing a procedure of determining a final response delay time by adjusting a response delay time by an image forming apparatus when an error is due to disconnection of a network by a firewall or a proxy according to an example.

Referring to FIG. 8, a maximum response delay time for long polling the external device 350 by the image forming apparatus 300 may be set to be 10 minutes. That is, a maximum delay in time by which the image forming apparatus 300 may receive a response from the external device 350 after the image forming apparatus 300 requests the external device 350 for a response about whether a job to be performed by the image forming apparatus 300 is present may be set to be 10 minutes.

A connection maintenance time between the image forming apparatus 300 and the external device 350 may be restricted by an error due to disconnection of the network by the firewall 360 or the proxy 370. For example, an error occurrence time due to disconnection of the network by the firewall 360 or the proxy 370 may be set to be 3 minutes 20 seconds. Therefore, the connection maintenance time between the image forming apparatus 300 and the external device 350 may be 3 minutes 20 seconds. The image forming apparatus 300 may receive a response indicating that an error occurs immediately after the error occurs, or receive the response after a while due to a process based on occurrence of the error. In FIG. 8, it is assumed that an error occurrence response reception time, which is taken for the image forming apparatus 300 to receive a response about occurrence of an error, is set to be 4 minutes 40 seconds.

As illustrated in FIG. 8, as a 1st attempt, the image forming apparatus 300 may request the external device 350 for a 1st long polling response about whether a job to be performed by the image forming apparatus 300 is present, based on a set maximum response delay time. When a job to be performed by the image forming apparatus 300 is not present, the image forming apparatus 300 may receive a response indicating that a job is not present after 10 minutes from when long polling is requested. However, since the network between the image forming apparatus 300 and the external device 350 is disconnected in 3 minutes 20 seconds by the firewall 360 or the proxy 370, the image forming apparatus 300 may not receive the response indicating that a job is not present. However, the image forming apparatus 300 may receive a response indicating that an error due to disconnection of the network by the firewall 360 or the proxy 370 occurs in 4 minutes 40 seconds.

As a 2nd attempt, the image forming apparatus 300 may reduce the response delay time based on the error occurrence response reception time to maintain a long polling connection without disconnection of the network by the firewall 360 or the proxy 370. The image forming apparatus 300 may adjust the response delay time within a time from a timing at which long polling is started to a timing at which the response about occurrence of the error is received. For example, the image forming apparatus 300 may reduce the response delay time to 4 minutes 30 seconds, which is shorter than the error occurrence response reception time (i.e., 4 minutes 40 seconds) by 10 seconds. The image forming apparatus 300 may request a 2nd long polling response from the external device 350 based on the secondly set response delay time. Likewise, since the network between the image forming apparatus 300 and the external device 350 is disconnected in 3 minutes 20 seconds by the firewall 360 or the proxy 370, the image forming apparatus 300 may not receive a response indicating that a job is not present. However, the image forming apparatus 300 may receive a response indicating that an error due to disconnection of the network by the firewall 360 or the proxy 370 occurs in 4 minutes 40 seconds.

When an error due to disconnection of the network by the firewall 360 or the proxy 370 is detected again by performing long polling based on the adjusted response delay time, the image forming apparatus 300 may repeatedly perform long polling by reducing the adjusted response delay time by a preset time until an error does not occur, and determine a response delay time corresponding to a timing at which an error does not occur as the final response delay time.

As a 3rd attempt, the image forming apparatus 300 may reduce the response delay time to 4 minutes, which is shorter than the previous response delay time (i.e., 4 minutes 30 seconds) by 30 seconds. The image forming apparatus 300 may request a 3rd long polling response from the external device 350 based on the thirdly set response delay time. However, since the network between the image forming apparatus 300 and the external device 350 is disconnected in 3 minutes 20 seconds by the firewall 360 or the proxy 370, the image forming apparatus 300 may not receive a response indicating that a job is not present.

Likewise, as a 4th attempt, the image forming apparatus 300 may reduce the response delay time to 3 minutes 30 seconds, which is shorter than the previous response delay time (i.e., 4 minutes) by 30 seconds. The image forming apparatus 300 may request a 4th long polling response from the external device 350 based on the fourthly set response delay time. However, since the network between the image forming apparatus 300 and the external device 350 is disconnected in 3 minutes 20 seconds by the firewall 360 or the proxy 370, the image forming apparatus 300 may not receive a response indicating that a job is not present.

As a 5th attempt, the image forming apparatus 300 may reduce the response delay time to 3 minutes, which is shorter than the previous response delay time (i.e., 3 minutes 30 seconds) by 30 seconds. The image forming apparatus 300 may request a 5th long polling response from the external device 350 based on the fifthly set response delay time. In this case, since the network between the image forming apparatus 300 and the external device 350 is disconnected in 3 minutes 20 seconds by the firewall 360 or the proxy 370, the image forming apparatus 300 may receive a normal response indicating that a job is not present, before the network is disconnected by the firewall 360 or the proxy 370.

The image forming apparatus 300 may maintain a long polling connection to the external device 350 by setting the fifthly set response delay time (i.e., 3 minutes) as the final response delay time. That is, since the image forming apparatus 300 may receive a response from the external device 350 before the network is disconnected by the firewall 360 or the proxy 370, the image forming apparatus 300 may appropriately communicate with the external device 350.

FIG. 9 is a flowchart of a method of determining a response delay time by an image forming apparatus when an error is not due to disconnection of a network by a firewall or a proxy according to an example.

Referring to FIG. 9, the image forming apparatus 300 may adjust the response delay time to a minimum value of a long polling cycle in operation 910.

In operation 920, the image forming apparatus 300 may determine whether an error is detected again by performing long polling based on the adjusted response delay time. When an error is detected again, the image forming apparatus 300 may determine whether an error is detected again by performing long polling again based on the response delay time adjusted to the minimum value of the long polling cycle. When an error is not detected again, according to operation 930, the image forming apparatus 300 may increase the adjusted response delay time by a preset time.

In operation 940, the image forming apparatus 300 may determine whether an error is detected again by performing long polling based on the increased response delay time. When an error is not detected again, the image forming apparatus 300 may repeatedly perform the operations of increasing the increased response delay time by a preset time, performing long polling based on the increased response delay time, and determining whether an error is detected again.

When an error is detected again, according to operation 950, the image forming apparatus 300 may determine a response delay time corresponding to a timing immediately before a timing at which an error is detected again as the final response delay time.

Figure 10:
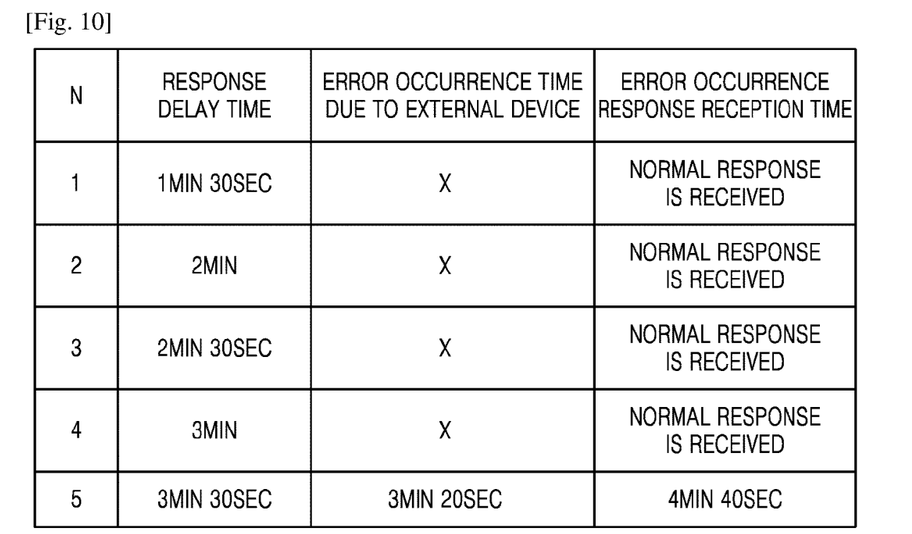
FIG. 10 is a table for describing a procedure of determining a final response delay time by adjusting a response delay time by an image forming apparatus when an error is not due to disconnection of a network by a firewall or a proxy according to an example.

FIG. 10 is a table for describing a procedure of determining a final response delay time by adjusting a response delay time by an image forming apparatus when an error is not due to disconnection of a network by a firewall or a proxy according to an example.

Referring to FIG. 10, when the error is due to the external device 350, the image forming apparatus 300 may set the response delay time to be a minimum value of a long polling cycle. For example, as a 1st attempt, the image forming apparatus 300 may set a minimum value of a long polling cycle to be 1 minutes 30 seconds and request the external device 350 for a response about whether a job to be performed by the image forming apparatus 300 is present based on the minimum value of the long polling cycle. As described above in relation to FIG. 8, an error occurrence time due to disconnection of the network by the firewall 360 or the proxy 370 may be set to be 3 minutes 20 seconds. In this case, before the network is disconnected by the firewall 360 or the proxy 370, the image forming apparatus 300 may normally receive a response from the external device 350.

When an error due to the external device 350 is not detected by performing long polling based on the response delay time adjusted to the minimum value of the long polling cycle, the image forming apparatus 300 may repeatedly perform long polling by increasing the adjusted response delay time by a preset time until an error occurs, and determine a response delay time corresponding to a timing immediately before a timing at which an error is detected again as the final response delay time.

As a 2nd attempt, the image forming apparatus 300 may increase the response delay time to 2 minutes, which is longer than the previous response delay time (i.e., 1 minutes 30 seconds) by 30 seconds. The image forming apparatus 300 may request a 2nd long polling response from the external device 350 based on the secondly set response delay time. In this case, before the network is disconnected by the firewall 360 or the proxy 370, the image forming apparatus 300 may normally receive a response from the external device 350.

As a 3rd attempt, the image forming apparatus 300 may increase the response delay time to 2 minutes 30 seconds, which is longer than the previous response delay time (i.e., 2 minutes) by 30 seconds. The image forming apparatus 300 may request a 3rd long polling response from the external device 350 based on the thirdly set response delay time. In this case, before the network is disconnected by the firewall 360 or the proxy 370, the image forming apparatus 300 may normally receive a response from the external device 350.

Likewise, at a 4th attempt, the response delay time may be set to be 3 minutes, and the image forming apparatus 300 may normally receive a response from the external device 350.

At a 5th attempt, the response delay time may be set to be 3 minutes 30 seconds. Since the network between the image forming apparatus 300 and the external device 350 is disconnected in 3 minutes 20 seconds by the firewall 360 or the proxy 370, the image forming apparatus 300 may not receive a normal response from the external device 350, but may receive a response indicating that an error due to disconnection of the network by the firewall 360 or the proxy 370 occurs in 4 minutes 40 seconds.

The image forming apparatus 300 may maintain a long polling connection to the external device 350 by setting the fourthly set response delay time (i.e., 3 minutes) as the final response delay time.

Figure 11:
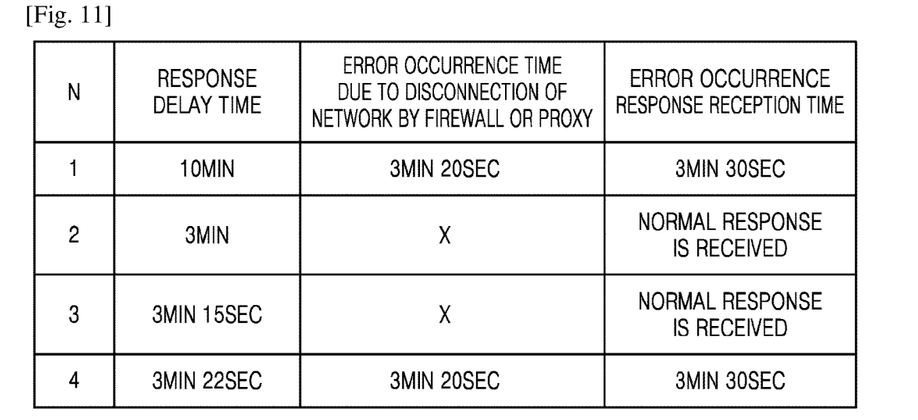
FIG. 11 is a table for describing a procedure of determining a final response delay time by adjusting a response delay time by an image forming apparatus when an error is due to disconnection of a network by a firewall or a proxy according to another example.

FIG. 11 is a table for describing a procedure of determining a final response delay time by adjusting a response delay time by an image forming apparatus when an error is due to disconnection of a network by a firewall or a proxy according to another example.

Referring to FIG. 11, a maximum response delay time for long polling the external device 350 by the image forming apparatus 300 may be set to be 10 minutes. An error occurrence time due to disconnection of the network by the firewall 360 or the proxy 370 may be set to be 3 minutes 20 seconds. An error occurrence response reception time, which is taken for the image forming apparatus 300 to receive a response about occurrence of an error, may be set to be 3 minutes 30 seconds.

As a 1st attempt, the image forming apparatus 300 may request the external device 350 for a 1st long polling response about whether a job to be performed by the image forming apparatus 300 is present based on the set maximum response delay time. When a job to be performed by the image forming apparatus 300 is not present, since the network between the image forming apparatus 300 and the external device 350 is disconnected in 3 minutes 20 seconds by the firewall 360 or the proxy 370, the image forming apparatus 300 may not receive a response indicating that a job is not present. However, the image forming apparatus 300 may receive a response indicating that an error due to disconnection of the network by the firewall 360 or the proxy 370 occurs in 3 minutes 30 seconds.

As a 2nd attempt, the image forming apparatus 300 may reduce the response delay time based on the error occurrence response reception time to maintain a long polling connection without disconnection of the network by the firewall 360 or the proxy 370. For example, the image forming apparatus 300 may reduce the response delay time to 3 minutes, which is shorter than the error occurrence response reception time (i.e., 3 minutes 30 seconds) by 30 seconds. The image forming apparatus 300 may request a 2nd long polling response from the external device 350 based on the secondly set response delay time. In this case, since the network between the image forming apparatus 300 and the external device 350 is disconnected in 3 minutes 20 seconds by the firewall 360 or the proxy 370, the image forming apparatus 300 may receive a normal response indicating that a job is not present before the network is disconnected by the firewall 360 or the proxy 370. In addition, the image forming apparatus 300 may determine whether the image forming apparatus 300 is capable of receiving a normal response by repeatedly performing long polling based on the secondly set response delay time.

To determine a more accurate response delay time, as a 3rd attempt, the image forming apparatus 300 may increase the response delay time to 3 minutes 15 seconds, which is longer than the previous response delay time (i.e., 3 minutes) by 15 seconds. The image forming apparatus 300 may request a 3rd long polling response from the external device 350 based on the thirdly set response delay time. Likewise, since the network between the image forming apparatus 300 and the external device 350 is disconnected in 3 minutes 20 seconds by the firewall 360 or the proxy 370, the image forming apparatus 300 may receive a normal response indicating that a job is not present before the network is disconnected by the firewall 360 or the proxy 370. In addition, the image forming apparatus 300 may determine whether the image forming apparatus 300 is capable of receiving a normal response by repeatedly performing long polling based on the thirdly set response delay time.

At a 4th attempt, the image forming apparatus 300 may increase the response delay time to 3 minutes 22 seconds, which is longer than the previous response delay time (i.e., 3 minutes 15 seconds) by 7 seconds. The image forming apparatus 300 may request a 4th long polling response from the external device 350 based on the fourthly set response delay time. Since the network between the image forming apparatus 300 and the external device 350 is disconnected in 3 minutes 20 seconds by the firewall 360 or the proxy 370, the image forming apparatus 300 may not receive a normal response from the external device 350, but may receive a response indicating that an error due to disconnection of the network by the firewall 360 or the proxy 370 occurs in 3 minutes 30 seconds.

By receiving the response indicating that the error due to disconnection of the network by the firewall 360 or the proxy 370 occurs in 3 minutes 30 seconds, the image forming apparatus 300 may predict that the error due to disconnection of the network by the firewall 360 or the proxy 370 occurs between the fourthly set response delay time (i.e., 3 minutes 22 seconds) and the error occurrence response reception time (i.e., 3 minutes 30 seconds). The image forming apparatus 300 may maintain a long polling connection to the external device 350 by setting the thirdly set response delay time (i.e., 3 minutes 15 seconds) as the final response delay time. In addition, the image forming apparatus 300 may predict the error occurrence time (i.e., 3 minutes 20 seconds) by repeatedly increasing or reducing the response delay time, and set a more optimal response delay time (for example, set the final response delay time to be 3 minutes 19 seconds).

The examples of the present disclosure can be written as computer programs and can be implemented in general-use digital computers that execute the programs using a non-transitory computer-readable recording medium. In addition, a data structure used in the examples of the present disclosure can be written in a non-transitory computer-readable recording medium through various means. The one or more examples may be embodied as computer readable code/instructions on a recording medium, e.g., a program module to be executed in computers, which include computer-readable commands. For example, methods that are implemented as software modules or algorithms may be stored as computer readable code or program instructions executable on a non-transitory computer-readable recording medium.

The non-transitory computer-readable recording medium may include any usable medium that may be accessed by computers, volatile and non-volatile medium, and detachable and non-detachable medium. Examples of the non-transitory computer-readable recording medium include, but are not limited to, magnetic storage media (e.g., ROM, floppy disks, hard disks, etc.), optical recording media (e.g., CD-ROMs, or DVDs), etc. Also, the non-transitory computer-readable recording medium may include a computer storage medium and a communication medium.

The non-transitory computer-readable recording media can be distributed over network-coupled computer systems, and data stored in the distributed recording media, e.g., a program command and code, may be executed by using at least one computer.

While one or more examples have been described with reference to the drawings, it will be understood by one of ordinary skill in the art that various changes and modifications may be made from the above descriptions. For example, even if the aforementioned technologies are carried out in an order different from that described above and/or illustrated elements, such as systems, structures, devices and circuits, are combined or united in forms different from those described above or are replaced or substituted with other elements or equivalents, the same results may be achieved.

Accordingly, it is noted that other implementations, other examples, and equivalents of the following claims also fall within the scope of the claims.

The invention claimed is:

1. An image forming apparatus comprising:
a communication device to communicate with an external device;
a processor; and
a memory storing instructions executable by the processor,
wherein the processor executes the instructions to:
request the external device for a response about whether a job to be performed by the image forming apparatus is present based on a response delay time for long polling the external device by the image forming apparatus;
detect an error between the image forming apparatus and the external device, the error corresponding to a value of the response received for the request;
adjust the response delay time based on the error; and
determine a final response delay time for maintaining a connection of the long polling by re-adjusting the adjusted response delay time based on a result of performing the long polling based on the adjusted response delay time.

2. The image forming apparatus of claim 1, wherein the processor further executes the instructions to:
determine whether the error is detected again by performing the long polling based on the adjusted response delay time;
increase or reduce the adjusted response delay time based on whether the error is detected again; and
determine the final response delay time in such a manner that the error is not detected by repeatedly performing the long polling based on the increased or reduced response delay time.

3. The image forming apparatus of claim 1, wherein the processor further executes the instructions to determine whether a network is connected between the image forming apparatus and the external device by performing the long polling based on a minimum response delay time for the long polling.

4. The image forming apparatus of claim 1, wherein the processor further executes the instructions to request the external device for a response about whether a job to be performed by the image forming apparatus is present based on a maximum response delay time for the long polling.

5. The image forming apparatus of claim 1, wherein the processor further executes the instructions to:
determine whether the error is due to the external device or due to a network between the image forming apparatus and the external device based on the response value; and
determine whether the error is due to disconnection of the network by a firewall or a proxy when the error is due to the network.

6. The image forming apparatus of claim 1, wherein the processor further executes the instructions to adjust the response delay time within a time from a timing at which the long polling is started to a timing at which the response including the error is received when the error is due to disconnection of a network by a firewall or a proxy.

7. The image forming apparatus of claim 6, wherein the processor further executes the instructions to:
repeatedly perform the long polling by reducing the adjusted response delay time by a preset time until the error does not occur; and
determine a response delay time corresponding to a timing at which the error does not occur as the final response delay time when the error is detected again by performing the long polling based on the adjusted response delay time.

8. The image forming apparatus of claim 1, wherein the processor further executes the instructions to adjust the response delay time to a minimum value of a cycle of the long polling when the error is not an error due to disconnection of a network by a firewall or a proxy.

9. The image forming apparatus of claim 8, wherein the processor further executes the instructions to:
repeatedly perform the long polling by increasing the adjusted response delay time by a preset time until the error occurs; and determine a response delay time corresponding to a timing immediately before a timing at which the error is detected again as the final response delay time when the error is not detected by performing the long polling based on the response delay time adjusted to the minimum value of the cycle of the long polling.

10. The image forming apparatus of claim 1, wherein the processor further executes the instructions to determine the final response delay time for maintaining connection of the long polling by re-adjusting the response delay time when a network connection maintenance time set between the image forming apparatus and the external device by the firewall or the proxy is changed.

11. An operating method of an image forming apparatus, the method comprising:
requesting an external device for a response about whether a job to be performed by the image forming apparatus is present based on a response delay time for long polling the external device by the image forming apparatus;
detecting an error between the image forming apparatus and the external device, the error corresponding to a value of the response received for the request;
adjusting the response delay time based on the error; and
determining a final response delay time for maintaining a connection of the long polling by re-adjusting the adjusted response delay time based on a result of performing the long polling based on the adjusted response delay time.

12. The method of claim 11, wherein the determining of the final response delay time comprises:
determining whether the error is detected again by performing the long polling based on the adjusted response delay time;
increasing or reducing the adjusted response delay time based on whether the error is detected again; and
determining the final response delay time in such a manner that the error is not detected by repeatedly performing the long polling based on the increased or reduced response delay time.

13. The method of claim 11, wherein the adjusting of the response delay time comprises adjusting the response delay time within a time from a timing at which the long polling is started to a timing at which the response including the error is received when the error is an error due to disconnection of a network by a firewall or a proxy.

14. The method of claim 11, wherein the adjusting of the response delay time comprises adjusting the response delay time to a minimum value of a cycle of the long polling when the error is not an error due to disconnection of a network by a firewall or a proxy.

15. A non-transitory machine-readable recording medium having recorded thereon instructions executable by a processor, the non-transitory machine-readable recording medium comprising:
instructions for requesting an external device for a response about whether a job to be performed by an image forming apparatus is present based on a response delay time for long polling the external device by the image forming apparatus;
instructions for detecting an error between the image forming apparatus and the external device, the error corresponding to a value of the response received for the request;
instructions for adjusting the response delay time based on the error; and
instructions for determining a final response delay time for maintaining connection of the long polling by re-adjusting the adjusted response delay time based on a result of performing the long polling based on the adjusted response delay time.

* * * * *